United States Patent
Garwin et al.

[11] Patent Number: 5,949,402
[45] Date of Patent: Sep. 7, 1999

[54] OPTICAL ALIGNMENT METHOD FOR POINTING DEVICES

[75] Inventors: Richard Lawrence Garwin, Scarsdale; James Lewis Levine, Yorktown Heights; Michael Alan Schappert, Fishkill, all of N.Y.

[73] Assignee: International Business Machines Corporation, Armonk, N.Y.

[21] Appl. No.: 08/800,934

[22] Filed: Feb. 13, 1997

[51] Int. Cl.[6] .................................................. G09G 5/00
[52] U.S. Cl. .......................... 345/156; 345/158; 235/462; 250/221; 349/62; 349/64; 359/454
[58] Field of Search ............................. 345/46, 156, 157, 345/158, 169; 349/62, 64; 359/454, 459, 530; 250/221, 206.1; 235/462, 472

[56] References Cited

U.S. PATENT DOCUMENTS

| | | | |
|---|---|---|---|
| 4,379,233 | 4/1983 | Rosenthal | 250/553 |
| 5,297,225 | 3/1994 | Snow et al. | 385/25 |
| 5,315,418 | 5/1994 | Sprague et al. | 359/41 |
| 5,317,140 | 5/1994 | Dunthorn | 250/221 |
| 5,550,656 | 8/1996 | Sprague et al. | 359/40 |
| 5,756,981 | 5/1998 | Roustaei | 235/462 |

*Primary Examiner*—Jeffery A. Hofsass
*Assistant Examiner*—Davetta Woods
*Attorney, Agent, or Firm*—McGinn & Gibb, P.C.

[57] ABSTRACT

This invention provides an optical pointing device, such as those used to control devices such as televisions, VCRs, video games and computers, which have improved accuracy and lower sensitivity to detrimental effects, such as noise and user hand unsteadiness, than prior art devices. Such pointing devices emit light beams, such as infrared light, which when received by a receiver are used to position cursors or other symbolic shapes, such as sliding volume controls. An advantage of the pointing device of the invention is that light emitting diodes of conventional manufacture, known to have poor optical precision and hence variable angular emission profiles, may nevertheless be used in the pointing device of the invention.

27 Claims, 7 Drawing Sheets

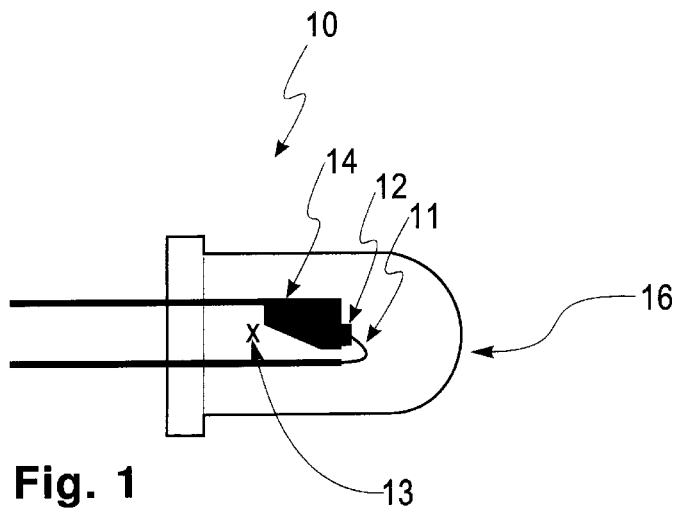
Fig. 1
PRIOR ART
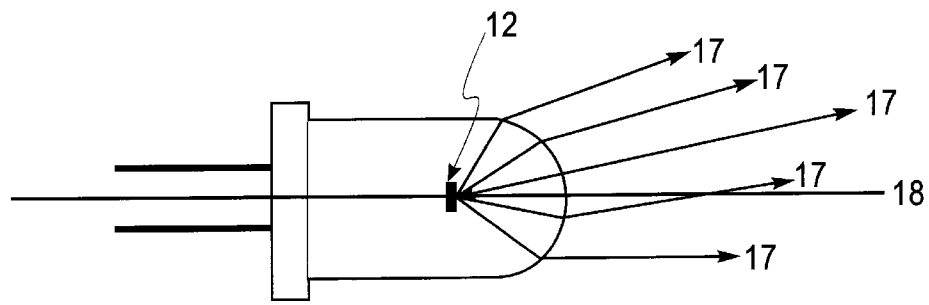
PRIOR ART Fig. 2
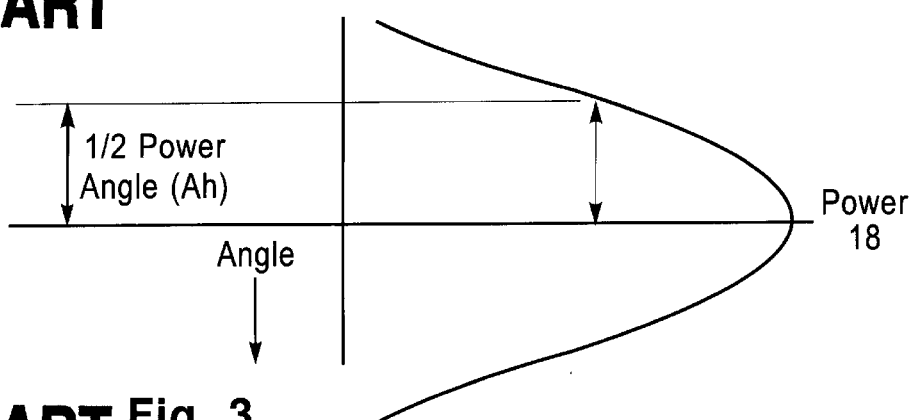
PRIOR ART Fig. 3

OPTICAL ALIGNMENT METHOD FOR POINTING DEVICES

FIELD OF THE INVENTION

The general field of this invention is that of optical pointing devices used to control devices such as televisions, VCRs, video games and computers, as by positioning a cursor on a display screen. More particularly, this invention relates to a method and apparatus for improving the optical alignment and optical beam profiles of the light emitting diodes (LEDs) frequently used in such devices, thereby improving the accuracy of the pointing device.

BACKGROUND OF THE INVENTION

One type of pointing device is that of King et al., (U.S. Pat. No. 4,565,999; herein incorporated by reference) which uses three or four infrared LEDs in a hand-held transmitter. The LEDs are pulsed in sequence. The pulse amplitudes are measured at a receiver and associated with the source LED by the position in the pulse sequence. The relative amplitudes are then used to calculate the pointing direction of the device with respect to the receiver which is then used to position a cursor. Smooth and predictable cursor positioning requires that the LEDs be aimed in precisely controlled directions relative to the axis of the transmitter. A further requirement is that the emission of light from each LED must decrease smoothly with the angle from the optic axis of the LED. Yet a further requirement is that the angular emission profiles of each LED be nearly identical. By emission profile is meant the manner in which the light emitted from the LED decreases with angle as measured from the axis of the LED. These requirements cannot presently be met with commercially available LEDs, even if these LEDs are mounted in perfect physical alignment, because the optical precision required of the LEDs used in such devices is beyond current LED manufacturing techniques.

SUMMARY OF THE INVENTION

This invention provides an optical pointing device, such as those used to control devices such as televisions, VCRs, video games and computers, which have improved accuracy and lower sensitivity to detrimental effects, such as noise and user hand unsteadiness, than prior art devices. Such pointing devices emit light beams, such as infrared light, which when received by a receiver are used to position cursors or other symbolic shapes, such as sliding volume controls. An advantage of the pointing device of the invention is that light emitting diodes of conventional manufacture, known to have poor optical precision and hence variable angular emission profiles, may nevertheless be used in the pointing device of the invention.

Generally, the pointing device of the invention consists of the light emitting diodes mounted to a suitable substrate, such as a circuit board, and situated behind an optical lens at a distance equal to the focal length of the lens. A light diffuser is situated in proximity to the lens to further adjust the light emission profiles from the light emitting diodes.

A method and apparatus are also provided for reproducibly manufacturing the optical pointing device of the invention.

BRIEF DESCRIPTION OF THE DRAWINGS

The above and other advantages of this invention will become more apparent from the following description taken in conjunction with the accompanying drawings, in which:

FIG. 1 is a schematic representation of a typical prior art light emitting diode.

FIG. 2 is a schematic representation of the light beam emission from the LED of FIG. 1.

FIG. 3 is a graph of the light emission profile from a LED.

DETAILED DESCRIPTION OF THE INVENTION

Figure 4:
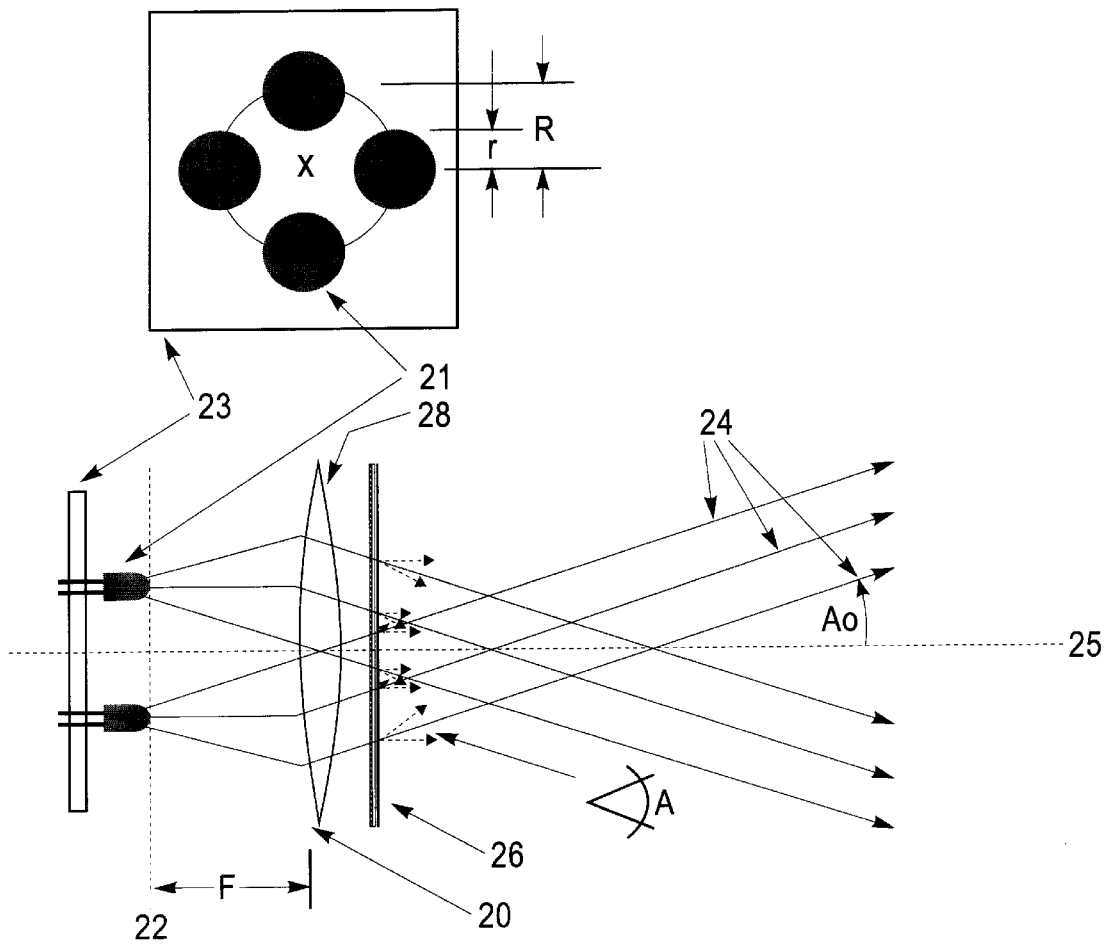
FIG. 4 shows an optical arrangement of the invention which provides aligned beams with matched emission profiles.

As noted above, for a truly accurate pointing device, the LED output beams must be accurately aligned with respect to one another, and have smooth and nearly identical emission patterns. Although it is easy to build an inexpensive LED mount which will align the bodies of the LEDs at the correct angles, this does not solve the problem for the reasons which follow.

As shown in FIG. 1, a typical LED 10 consists of an emitting chip 12 mounted on a lead frame 14 and encapsulated in transparent epoxy resin, with a lens 16 formed at one end. One electrical connection is by wire 11. The light from chip 12 is emitted in all directions. The purpose of lens 16 is to direct the light into a smaller range of angles. The location of chip 12 relative to axis 18 determines the spread of the beam. If chip 12 is located off axis 18, the rays 17 emitted by LED 12 will be at an angle to axis 18 as is shown in FIG. 2. LED manufacturing tolerances are such that the aim may deviate from axis 18 by 5 degrees or more in a random direction, while the half-power angle, as defined by FIG. 3, may vary by several degrees. Further, the emission pattern may have fine-scale irregularities because of surface blemishes or bubbles in epoxy resin lens 16, interference from wire 11 and the metallization pattern of chip 12. These problems have made it heretofore impossible to assemble pointing devices having satisfactory performance without costly LED selection and post-assembly adjustment. By LED selection, it is meant to sort, grade and match individual LEDs in order to optimize the optical alignment of a plurality of LEDs.

The solution of this invention to the aforementioned problem separates the problem into two parts—angular alignment and beam profile. The first part is accomplished by an inexpensive optical system in which the direction of the beam from each LED is determined solely by the position of the LED in an array. The second part is accomplished by using a separate optical diffusing material to provide the proper beam spread.

The optical arrangement is shown in FIG. 4. It makes use of lens 20 of focal length "F". Four LEDs 21 of radius "r" are equally spaced around a circle of radius "R" and placed at the focal plane 22 of lens 20. Here, they are shown mounted on a suitable substrate, e.g., printed circuit board 23. From elementary optics, the output beams 24 will be offset from axis 25 by angles Ao, given by:

$$Ao = Arctan(R/F) \tag{1}$$

The angle does not depend on the direction of the light leaving the LED but only on the radial location R of the LED. There will, however, be an angular spread because the light from different parts of the LEDs will leave from different radial locations and will thus have different directions. The angular spread "ΔA" will be (approximately):

$$\Delta A \approx r/f \quad r/F \ll 1 \tag{2}$$

By using small-diameter LEDs, this spread can be made much less than the width of the desired beam profile. The final beam profiles are then provided by a common optical diffuser 26, and will thus be nearly the same for each beam. The selection of beam profile and offset angle Ao will be discussed later. Excellent diffusing material with very predictable dispersion profiles is available, such as the beam homogenizing material manufactured by Physical Optics Corporation of Torrance, CA. If desired, outer surface 28 of lens 20 can be formed to act as the diffuser.

Figure 5A:
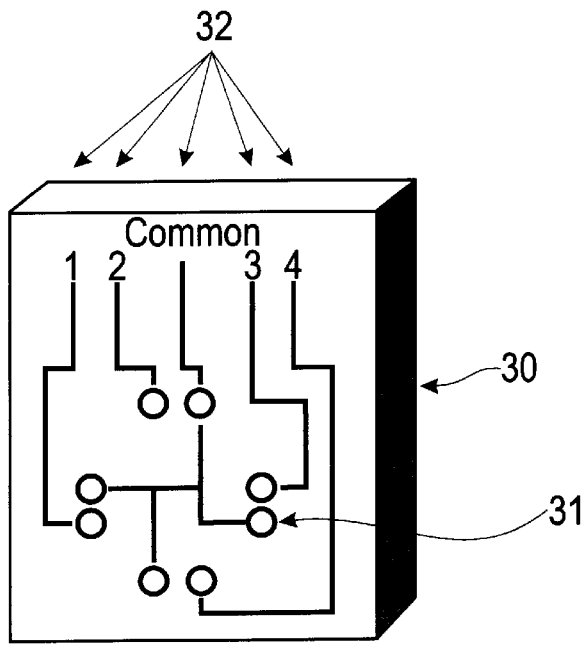
FIG. 5A shows a plan view of a printed circuit board and FIG. 5B shows a plan view of the positioning jig for LED mounting.
Figure 5B:
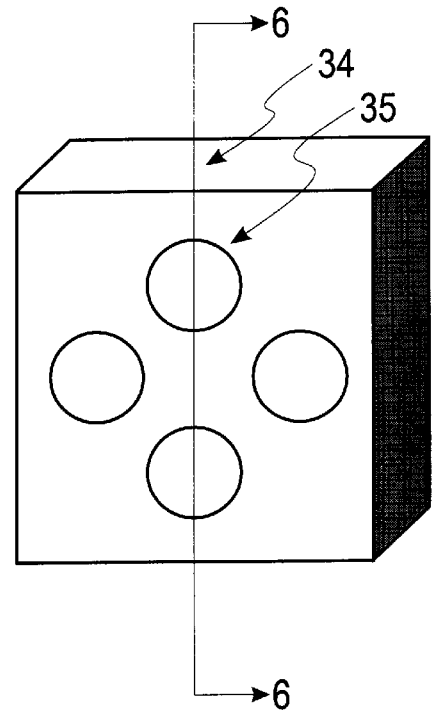
Figure 6:
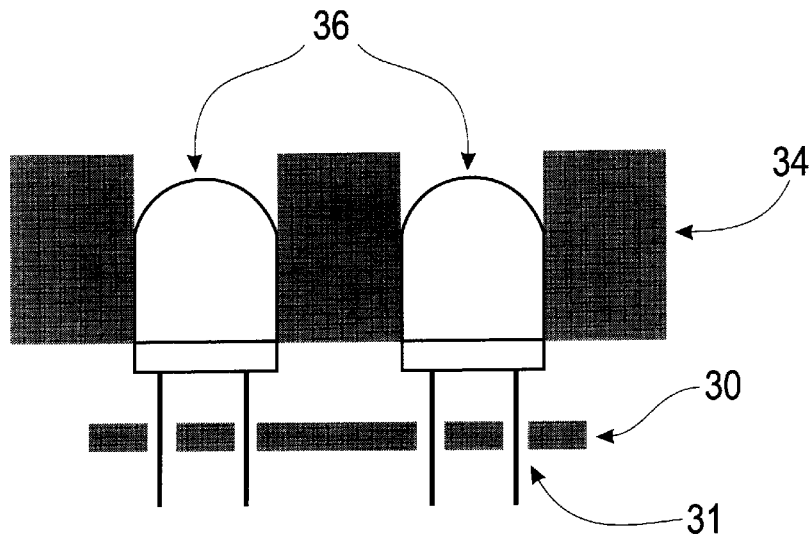
FIG. 6 is a cross-section of the jig of FIG. 5 positioning two LEDs.

Apart from the lens and diffuser, a means is needed to mount the LEDs at the required positions. This is accomplished, for example, by mounting the LEDs to a circuit board using positioning jig 34, as shown in FIGS. 5 and 6. Circuit board 30 has solder pads 31 and leads 32 for connection to the LED drive circuitry. Pads 31 have loose-fitting holes for the LEDs. The LEDs are held in position during soldering by jig 34, which has accurately-positioned apertures 35 making a snug fit with the LEDs. While the optics of current LEDs are not well controlled, their physical dimensions are. Jig 34 is shown in position in FIG. 6, holding LEDs 36 during soldering. Because of the loose fit at pads 31, the leads are unstressed during the soldering step, and thus do not spring back after jig 34 is removed. Therefore, the LEDs remain in the positions defined by apertures 35 in jig 34. The maximum placement error is thus determined by manufacturing variations in the LED diameter. The largest error in the radial position of the LED from the center of the jig will be $(D_{max}-D_{min})$ where $D_{max}$ is the maximum diameter and $D_{min}$ is the minimum diameter. This assembly can then be mounted at the focal plane of the lens. Small errors in mounting this assembly relative to the lens do not affect the relative aim of the LEDs.

Other variations of the above process are possible. For example, the LED leads may be inserted into sockets rather than being soldered and the jig may be left in place as part of the pointing device. A potential advantage of leaving the jig in place is that the LEDs may now be aimed toward the center of the lens which, while maintaining the desired offset angle Ao, permits the use of smaller diameter lenses.

In order to demonstrate the invention, an existing four LED pointing device was selected. The four LEDs in the existing device, which had been individually selected and adjusted after assembly by trial and error, were removed and replaced by four LEDs mounted as follows. A soldering jig, consisting of a nylon block with four accurately located holes was used to position the LEDs on a printed circuit board. The holes for the leads were somewhat larger than the LED leads. This allowed the LEDs to be positively positioned by the jig without stressing the leads, eliminating "spring-back" when the jig was removed after soldering. A commercially available plastic Fresnel lens and a commercially available diffuser were used. A half dozen units were assembled using randomly selected LEDs. No adjustments were made after assembly. All units operated properly, in that the cursor tracked the hand motion smoothly and predictably, even when the lens was intentionally mispositioned axially and radially by amounts which greatly exceeded normal manufacturing tolerances.

The choice of offset angle and beam profile have a direct bearing on the usability of a pointing device of the type described. A simple mathematical model for the design of the device is presented, and then used to select the offset angle and beam profile.

Referring to FIG. 4, assume that diffuser 26 provides output beams whose intensity decreases with angle "A", measured from the offset angle Ao according to the Gaussian function:

$$I = I_0 \exp(-A/B)^2 \tag{3}$$

Figure 7A:
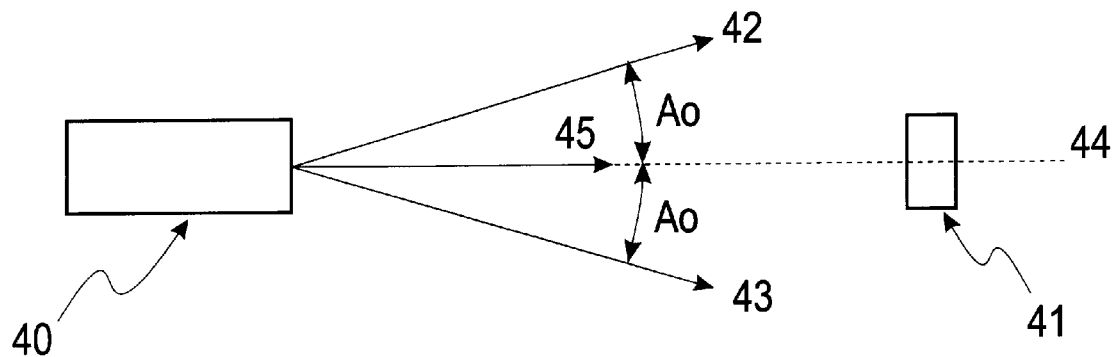
FIGS. 7A and 7B illustrate the geometry used to derive design equations for the pointing device.
Figure 7B:
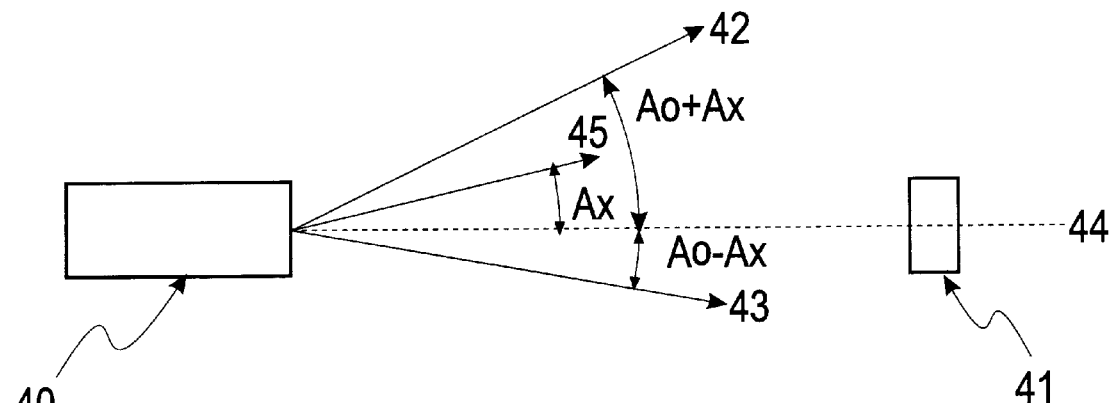

Here, B is the Gaussian spread factor which is a characteristic of the diffuser and is the angle at which the intensity of the transmitted light has decreased to 1/e where e is 2.718. Such diffusers are characterized by their manufacturer in terms of the half-power angle, Ah, which is given by 0.83 B. A Gaussian function has been chosen because of the ready availability of diffusers which provide such a profile. Other diffusers providing a smooth decrease with angle can also be used. Referring to FIG. 7A, which is a view from above, assume that the pointing device 40 has four beams, each offset by angle Ao from the central axis 45 of the device. Let one beam 42 point to the left of axis 45, one beam 43 point to the right, one point down and one point up. For clarity, only the left and right beams 42 and 43 are shown. Line-of-sight line 44 between pointing device 40 and receiver 41 is also shown. Because the angles Ao between beams 42 and 43 and line of sight 44 are equal, the intensity of light at receiver 41 from beams 42 and 43 will be equal. With a clockwise rotation of pointer 40 around a line perpendicular to the plane of FIG. 7A, pointer axis 45 will now make an angle Ax with the line of sight 44. The result is shown in FIG. 7B. The beam angles to receiver 41 will now be (Ao+Ax) for beam 42 and (Ao−Ax) for beam 43. Denoting the intensity of beams 42 and 43 at receiver 41 by $I_1$ and $I_2$ respectively, we have:

$$I_1 = I_0 \exp-((Ax-Ao)/B)^2 \tag{4a}$$

$$I_2 = I_0 \exp-((Ax+Ao)/B)^2 \tag{4b}$$

The factor $I_0$ will decrease inversely with the square of the distance to the receiver, and will also decrease if the device is aimed up or down. The following ratio, however, depends only on the angle of aim Ax in the horizontal plane:

$$Xm = (I_1 - I_2)/(I_1 + I_2) = \tanh(2AxAo/B^2) \tag{5a}$$

where tanh is the hyperbolic tangent function. Similarly, let Ay be the pointing angle in the vertical plane. If the up and down pulses are numbered 3 and 4 respectively, we have:

$$Ym = (I_3 - I_4)/(I_3 + I_4) = \tanh(2AyAo/B^2) \tag{5b}$$

Equations 5a and 5b can be solved for the rotation angles Ax and Ay, in terms of the inverse hyperbolic tangent function, arctanh:

$$Ax = (B^2/2Ao) \text{ arctanh } (Xm) \quad (6a)$$

$$Ay = (B^2/2Ao) \text{ arctanh } (Ym) \quad (6b)$$

Expanding the arctanh function for small values of the argument we find:

$$Ax \approx (B^2/2Ao)((I_1 - I_2)/(I_1 + I_2)) \quad (7a)$$

$$Ay \approx (B^2/2Ao)(I_3 - I_4)/(I_3 + I_4)) \quad (7b)$$

Thus, the pointing angles can be calculated by suitable circuitry (e.g., a microprocessor) located, for example, in receiver 41 by taking simple ratios of the pulse amplitudes. These pointing angles can then be used to position a cursor on a display screen.

The above equations can be used to select optimum values for the offset angle Ao and Gaussian spread factor B. By optimum, we mean values which provide a well-behaved relationship between hand motion and cursor motion. In particular, the cursor must be perceived to follow the intended hand motion smoothly and without visible jitter. Cursor jitter and irregular motion are caused by hand-tremor, and by noise in the pulse amplitude measuring system. The effects of hand tremor are considered first. Suppose that the device is noise-free over an angular range of ± Am degrees. That is, the angles calculated using equations 6a and 6b are stable if the device is aimed within the angular range ± Am and held stationary. This range could then be used to move the cursor from one side of the display to the other. We refer to this as mapping the angular range to the cursor motion i.e., taking values of angles (Ax, Ay) and translating them into cursor position. Now consider hand tremor, such that the pointing angle varies over a range δA. Then the cursor position will vary by a fraction γ of the width of the display, given by:

$$\gamma = \delta A / 2Am \quad (8)$$

Whether or not jitter of the cursor due to hand tremor is noticeable depends on the user's eyesight and distance from the screen. Generally, values for γ less than about 0.2% are necessary for the cursor to appear free of jitter. A digital filter can be applied to the calculated angles to reduce the cursor jitter, but cannot eliminate it without introducing objectionable time delays. Ref erring to equation 8, we have no control over the user's hand tremors (δA), thus cursor jitter can only be reduced by choosing a large enough value for Am. It has been found by direct experiment that almost anyone can use a pointer having a value for Am in the range of ±15–20 degrees. However, many individuals find the hand motion excessive and/or the response to be sluggish. Such individuals can be accommodated merely by changing the mapping, which can be done in software.

Thus, hand tremor effects can be dealt with by designing the device to have a maximum angular range of at least ±Am, where Am is between about 15 and 20 degrees. The value of Am is affected by the values of Ao and B in two ways. First, there are problems with the diffusers used to produce the Gaussian profile. Thus, we find by direct measurement or manufacturer's specifications that the intensity does not fall as rapidly as a true Gaussian once it has fallen below a fraction α of the peak value, but instead approaches a constant value. A typical value for α is about 0.1. The effect is to reduce the sensitivity to pointer rotation progressively with angle, effectively limiting the angular range. Using equation 4a, we find a relationship between the value for α and the maximum angle Am:

$$\exp - ((Am + Ao)/B)^2 = \alpha \quad (9a)$$

$$(Am + Ao)/B = \sqrt{-\text{Ln}\alpha} \quad (9b)$$

$$Am = B\sqrt{-\text{Ln}\alpha} - Ao \quad (9c)$$

Once Am is specified (i.e. Am±17), equation 9c provides a relationship between Ao and B, but not separate values.

The measurement of pulse amplitudes is considered next. In the receiver, the signal from a photodetector is demodulated, passed through an adjustable gain amplifier and then converted to digital values with an analog-to-digital convertor (ADC). These values are input to a digital processor, which identifies the pulses by detecting upwards and downwards crossings of a threshold. The processor then determines the pulse amplitudes, which are used to calculate the angles Ax and Ay from equations 7a and 7b. After each sequence of four pulses, the processor adjusts the amplifier gain so that the largest pulse in the next sequence will be close to the full scale range of the ADC. This minimizes the effect of digital roundoff errors in the ADC. We have found it necessary to maintain the threshold for detecting pulses at about 10–20% of the full ADC range in order to minimize false detections. As a result, we require that the ratio of the smallest pulse amplitude $I_{min}$ to the largest pulse amplitude $I_{MAX}$ of a four pulse sequence to be greater than about 10–20%. If this ratio is denoted by η we have:

$$\eta = I_{min}/I_{max} \quad (10)$$

From equations 4a and 4b, it can be seen that as the angle Ax or Ay is increased, the ratio of the smallest to largest pulse will continually decrease:

$$I_{min}/I_{max} \exp(-4AxAo/B^2) \quad (11)$$

The pointer will cease working when the angle Am satisfies:

$$Am = -B^2 ln\eta/4Ao \quad (12)$$

The exact value of η depends on the photodetector and amplifier noise and the details of the detection algorithm. However, the maximum operating angle Am depends only on the logarithm of η, which is insensitive to the value of η.

Figure 8:
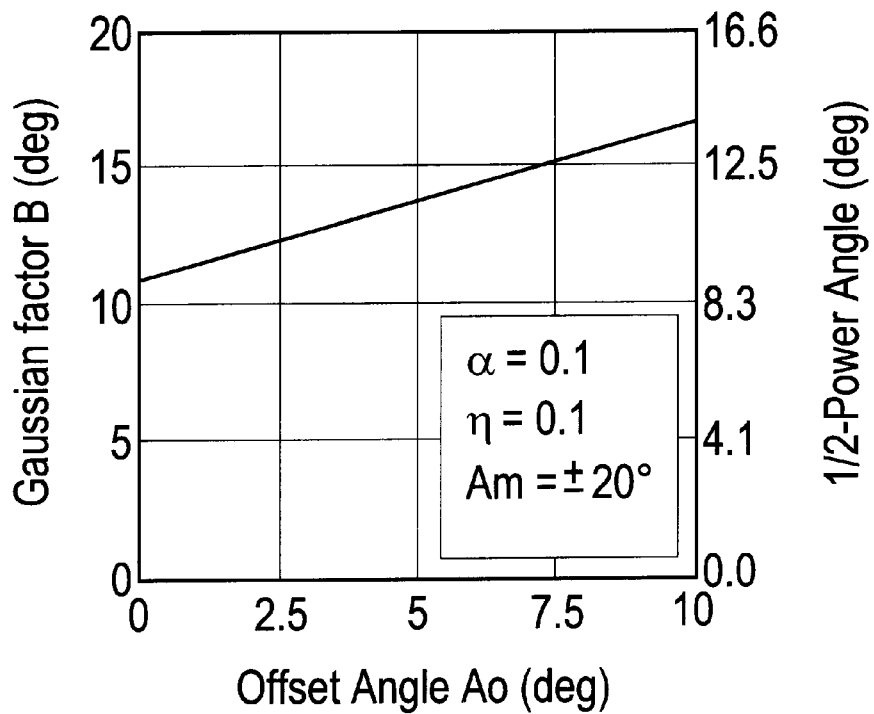
FIG. 8 is a plot of Gaussian spread factor B versus offset angle $A_o$.

Equation 9c and equation 12 each predict a different angular range ±Am as a function of offset angle Ao and diffuser spread factor B. The actual value of Am for a particular choice of Ao and B will be the lower of the two calculated values. FIG. 8 is a plot of B versus Ao for an angular range of ±20°. The plot was constructed numerically using equations 9c and 12, with α=0.1 and η=0.1. The left-hand scale of FIG. 8 gives values of B for the diffuser, while the right-hand scale gives equivalent half-power angles Ah. For the discussion below, note that B increases monotonically with AO.

Any point on the curve of FIG. 8 will produce the desired angular range set forth by equations 9c and 12. However, there are other considerations which restrict the choice of Ao to the central portion of the curve. Thus on one hand, large values of Ao, and thus B, disperse the LED output, reducing the linear range and/or battery lifetime. The power output in the forward direction, say Pf, is a good measure of range. For a given LED power level, it is proportional to:

$$Pf(1/B^2) \exp(-(Ao/B)^2) \quad (13)$$

Figure 9:
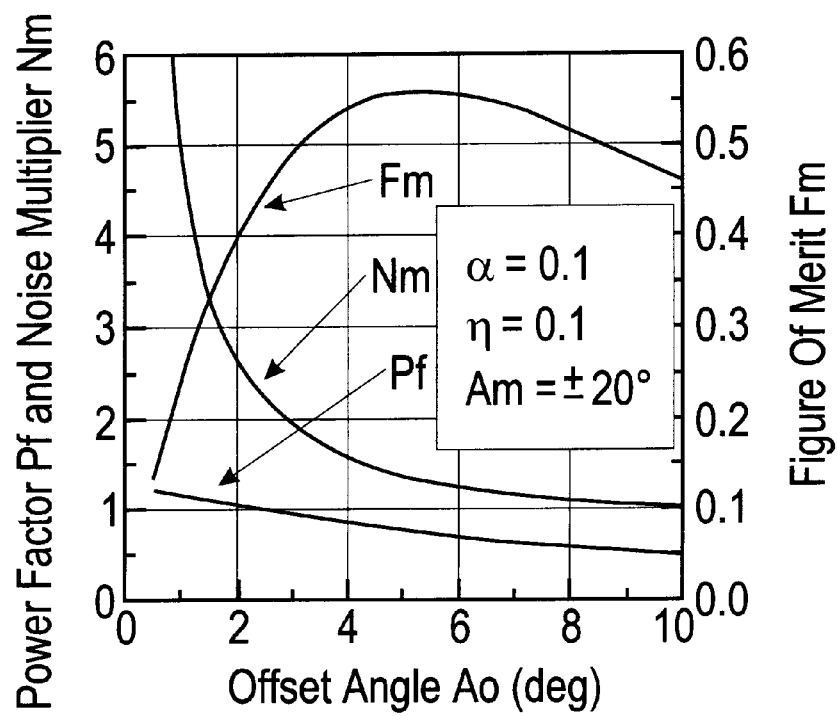
FIG. 9 is a plot of forward power factor $P_f$, noise multiplier Nm and figure of merit Fm versus offset angle $A_o$.

A plot of Pf versus Ao is shown in FIG. 9. The forward power decreases slowly but progressively with Ao, so that small values of Ao are advantageous. On the other hand, the basic operation of the device is predicated on a non-zero value for Ao. Thus, the transfer functions of Equations 5a and 5b vanish as Ao approaches zero, i.e. the device becomes insensitive to rotation as Ao is decreased. Because the effects of noise (optical, electrical and ADC-roundoff errors) are always present in the calculated cursor position, the result is to multiply the cursor jitter by the inverse of the transfer function. Denoting the noise multiplier by Nm and expanding the inverse hyperbolic tangent functions of equations 5a or 5b for small values of Ao yields:

$$Nm=B^2/2AoAm \qquad (14)$$

This is also plotted in FIG. 9, showing a rapid increase in noise as Ao falls below about 3°. These two effects can be combined into a "figure of merit", Fm:

$$FM=Pf/Nm \qquad (15)$$

This is also shown in FIG. 9. The figure of merit shows a broad peak centered on a value for Ao of about 5°. It is noted that the calculation is approximate, and that it depends on the parameters η and α. These parameters depend on properties of both the diffuser and the detection hardware and software. Thus, the optimum values for Ao and B (from FIG. 8) can be modified to take advantage of future improvements without departing from the spirit of the invention.

A final limitation is set by practical considerations. Referring to Equation 1, small values of Ao require a small value for LED spacing R and a large value for focal length F. The LED spacing is limited by available LED diameters to about 0.2" or so. The focal length of the lens is limited to a few inches because the optical system must fit inside the handheld pointer. The result is a value for Ao greater than about 4°, which is compatible with the curves of FIG. 9.

Figure 10:
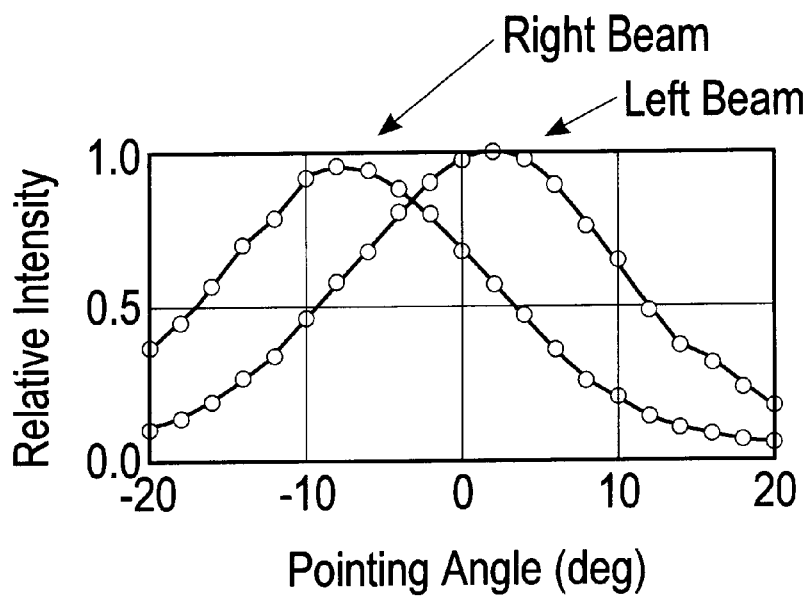
FIG. 10 is a plot of signal strength versus horizontal pointing angle for the left and right LEDs.
Figure 11:
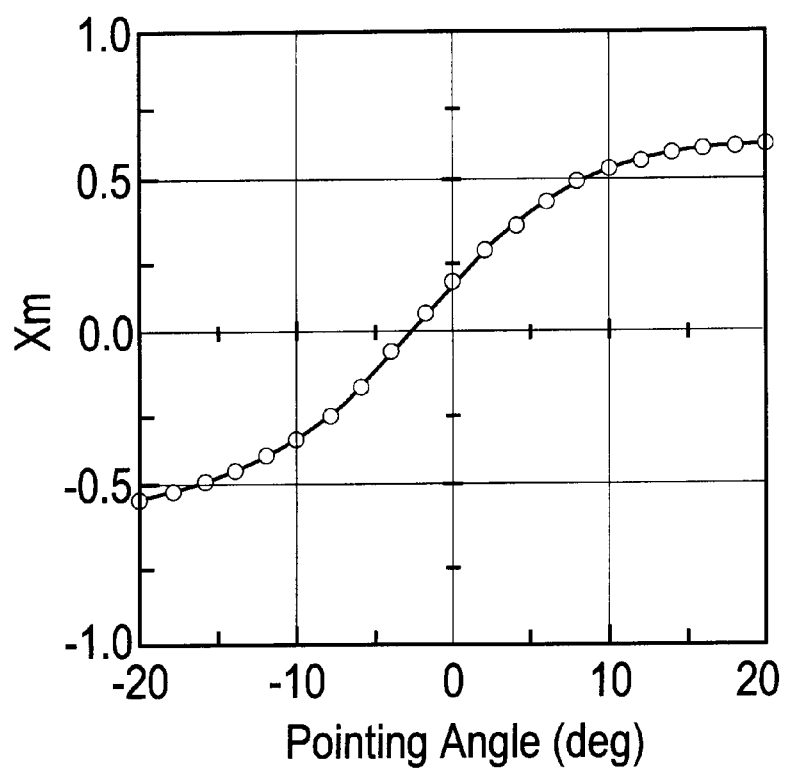
FIG. 11 is a plot of the horizontal transfer function versus pointing angle for the data of FIG. 10.

FIG. 10 shows the measured intensity curves for a pointer having an offset angle of 5° and a Gaussian diffuser with a half-power angle of 15°. The curves show a somewhat lower half-power angle of about 11°, a result of the light striking the diffuser 5° from normal incidence. The calculated ratio Xm is shown in FIG. 11, which shows a maximum usable angle of ±17°, a value close to the desired value.

Figure 12:
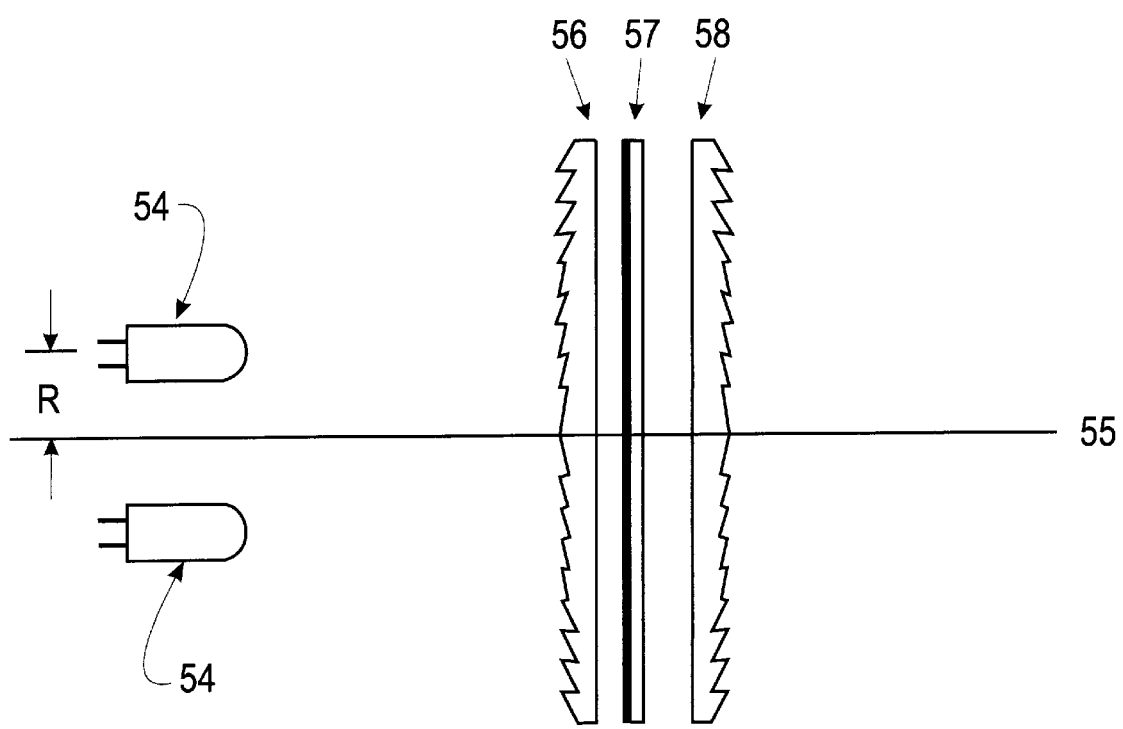
FIG. 12 shows an optical arrangement of the invention with a beam expanding lens.

The reduction in beam width noted above can be partially corrected by adding a second lens 58 (here represented as a Fresnel lens as is lens 56) after diffuser 57 or before diffuser 57 depending upon the location of lens 56 (i.e., on the side of diffuser 57 opposite to the side on which the first lens is located). The arrangement is shown in FIG. 12. Here, light from LEDs 54 passing through lens 58 is refracted through an angle which increases with radial distance from the center. The net effect is to broaden the beams. An undesirable side-effect is to re-introduce some dependence on the LED properties, as the LED alignment and beam profiles will affect the radial distribution of light. Therefore, only a small correction should be made.

It is also possible to use the same optical configuration in an integrated device, in which four bare LED chips 12 are positioned in front of lens 20 in a single package. The four LEDs could also be formed on a single, larger chip. In either case, it would be necessary to provide some degree of optical isolation between the emitting regions of the chips. As with a conventional LED, the lens 20 may be a separate part, or may be formed in place by casting or molding.

As those skilled in the optics arts will realize, and guided by the inventive teachings herein, other optical arrangements may be employed. For example, in FIG. 4, diffuser 26 may be situated in close proximity to lens 20, but behind it rather than in front as shown. Lenses other than the biconvex lens shown in FIG. 4, such as a Fresnel lens as shown in FIG. 12, may be used. Further, the diffuser may be integral with the lens such as by forming it on the surface of a plastic lens during the lens molding step or, as illustrated in FIG. 4, it may be separate.

While the invention has been illustrated with a device having four light emitting diodes, three is the minimum number which can be used, and more than four can be used for cases where improved accuracy and/or a wider angular operating range is desired. Also, while the invention has been illustrated with light emitting diodes emitting in the infrared, the principles of the invention are also applicable to emitted beams of other wavelengths.

While this invention has been described in terms of preferred embodiments thereof, it will be appreciated by those having skill in the art that variations may be made in the invention without departing from the spirit and scope of the invention. Accordingly, the scope of our invention is to be limited only by the following claims.

What is claimed:

1. The pointing device wherein said lens is positioned in front of said diffuser.

2. The pointing device of claim 1 wherein said lens is positioned in back of said diffuser.

3. The pointing device of claim 1 further including a second lens positioned so as to be on the side of said diffuser opposite to said lens.

4. The pointing device of claim 1 wherein said lens comprises a Fresnel lens.

5. The pointing device of claim 1 wherein said lens comprises a biconvex lens.

6. The pointing device of claim 3 wherein at least one of said lenses comprises a Fresnel lens.

7. An optical pointing device comprising:
   a. a plurality of light emitting diodes, said diodes being mounted in a predetermined arrangement on a substrate;
   b. a lens positioned in front of said light emitting diodes by a distance equal to the focal length of said lens; and
   c. a diffuser positioned in proximity to said lens, the pointing device having a predetermined desired angular operating range, Am, wherein said lens, said diffuser and the spacing of said light emitting diodes are chosen such that the figure of merit $Fm=P_f/Nm$ is optimized.

8. The pointing device of claim 7 wherein $P_f$ is proportional to $(1/B^2)$ exp $(-(Ao/B)^2)$ and $Nm=B^2/2AoAm$ where Ao is the offset angle, B is the Gaussian spread angle and Am is the desired angular operating range.

9. The pointing device of claim 8 wherein said lens is positioned in front of said diffuser.

10. The pointing device of claim 8 wherein said lens is positioned in back of said diffuser.

11. The pointing device of claim 8 further including a second lens positioned so as to be on the side of said diffuser opposite to said lens.

12. The pointing device of claim 8 wherein said lens comprises a Fresnel lens.

13. The pointing device of claim 8 wherein said lens comprises a biconvex lens.

14. The pointing device of claim 11 wherein at least one of said lenses comprises a Fresnel lens.

15. An optical pointing device comprising:
   a. a plurality of light emitting diodes, said diodes being mounted in a predetermined arrangement on a substrate;
   b. a lens positioned in front of said light emitting diodes by a distance equal to the focal length of said lens; and c. a diffuser positioned in proximity to said lens, the pointing device having a predetermined desired angular operating range, Am, wherein said lens, said diffuser and the spacing of said light emitting diodes are chosen such that the figure of merit $Fm=P_f/Nm$ is optimized.

16. The pointing device of claim 15 wherein $P_f$ is proportional to $(1/B^2) \exp(-(Ao/B)^2)$ and $Nm=B^2/2AoAm$ where Ao is the offset angle, B is the Gaussian spread angle and Am is the desired angular operating range.

17. A method for positioning light emitting diodes in a pointing device comprising:
   a. providing a plurality of light emitting diodes behind a lens, such that said light emitting diodes are located at the focal plane of said lens, said diodes having a forward facing light emitting region and electrical connection leads extending from a rearward facing region opposite to said forward facing region;
   b. preparing a positioning device having apertures therethrough in a predetermined arrangement, said apertures sized to snugly accommodate said light emitting diodes;
   c. providing a substrate for holding said light emitting diodes in said predetermined configuration, said substrate having apertures therethrough to loosely accommodate said electrical connection leads;
   d. positioning said light emitting diodes in said substrate such that said leads associated with said light emitting diodes pass through corresponding apertures in said substrate;
   e. positioning said positioning device over said light emitting diodes; and
   f. soldering said leads to said substrate.

18. A method for positioning light emitting diodes in a pointing device comprising:
   a. providing a plurality of light emitting diodes, said diodes having a forward facing light emitting region and electrical connection leads extending from a rearward facing region opposite to said forward facing region;
   b. preparing a positioning device having apertures therethrough in a predetermined arrangement, said apertures sized to snugly accommodate said light emitting diodes;
   c. providing a substrate for holding said light emitting diodes in said predetermined configuration, said substrate having apertures therethrough to loosely accommodate said electrical connection leads;
   d. positioning said light emitting diodes in said substrate such that said leads associated with said light emitting diodes pass through corresponding apertures in said substrate;
   e. positioning said positioning device over said light emitting diodes;
   f. soldering said leads to said substrate; and removing said substrate with said light emitting diodes from said positioning device.

19. A method for selecting the optical parameters for an optical pointing device having improved accuracy and stability comprising the steps of:
   a. selecting an operating angular range, ±Am;
   b. obtaining a value for threshold factor η from known receiver properties and:

i) $\eta = I_{min}/I_{max}$ and c. calculating the curve of Gaussian parameter B vs Ao using η and the α corresponding to the diffuser from whichever of i) and ii) below is the smaller:

$$Am = B\sqrt{-Ln\alpha} - Ao;\qquad \text{i)}$$

$$Am = -B^2 Ln\eta / 4Ao;\qquad \text{ii)}$$

and d. constructing a curve of figure of merit, Fm, versus offset angle Ao from:

i) $Pf(1/B^2) \exp(-(Ao/B)^2)$ and ii) $Nm=B^2/2AoAm$ and iii) $Fm=Pf/Nm$ and e. selecting the optimum offset angle, Ao, from said curve of Fm vs. Ao to thereby provide a maximum value of Fm; and
   f. selecting a value for B corresponding to Ao optimum using said curve of B vs Ao; and
   g. selecting light emitting diode spacing R and lens focal length F using said optimum offset angle Ao and:

i) $Ao=\mathrm{Arctan}(R/F)$

20. The pointing device according to claim 1, wherein said plurality of light emitting diodes includes no less than three light emitting diodes.

21. The pointing device according to claim 1, wherein an angular emission profile of each of said light emitting diodes is made substantially identical to one another.

22. The pointing device according to claim 1, wherein an angular emission profile of each of said light emitting diodes is made substantially smooth.

23. The pointing device according to claim 1, wherein a direction of a beam from a light emitting diode is determined solely by a position of the light emitting diode in the plurality of light emitting diodes.

24. The pointing device according to claim 1, wherein said diffuser comprises an outer surface coating of said lens.

25. The pointing device according to claim 1, wherein said diffuser is integrally formed with said lens.

26. The pointing device according to claim 1, wherein an optical signal output by said lens allows orientation of the device to be determined by measurements made at a remote detector, such that detected signals are processed to allow a user to position a graphic display.

27. The pointing device according to claim 1, wherein said lens and said diffuser in combination provide multiple, precisely controlled angular beam profiles of outputs of said plurality of light emitting diodes.

* * * * *